C. BUCHWALD, P. QUEISSER AND H. VIERTEL.
NEGATIVE ELECTRODE FOR SEARCH LIGHTS, PROJECTORS, AND THE LIKE.
APPLICATION FILED APR. 1, 1912. RENEWED OCT. 3, 1918.
1,302,895. Patented May 6, 1919.
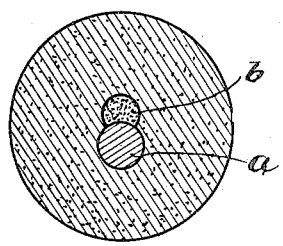
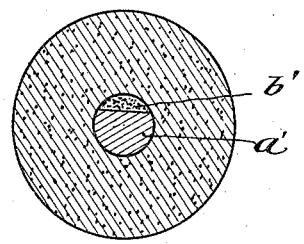
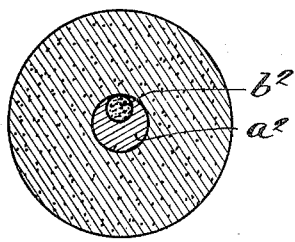
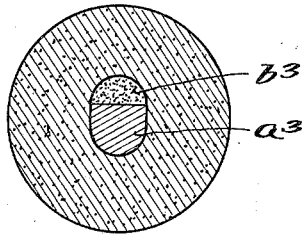
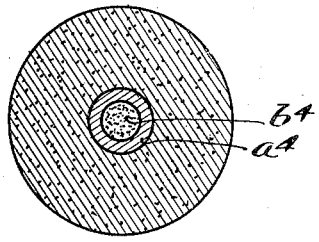
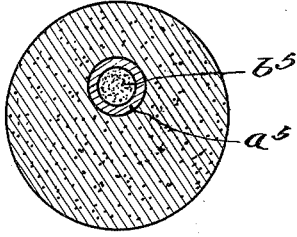
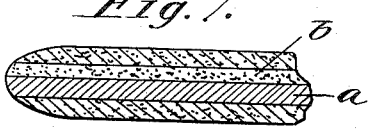

UNITED STATES PATENT OFFICE.

CARL BUCHWALD, OF BERLIN, PAUL QUEISSER, OF FRIEDENAU, NEAR BERLIN, AND HERMANN VIERTEL, OF LICHTENBERG, NEAR BERLIN, GERMANY, ASSIGNORS TO GEBRUEDER SIEMENS & CO., OF BERLIN, GERMANY, A COPARTNERSHIP OF GERMANY.

NEGATIVE ELECTRODE FOR SEARCH-LIGHTS, PROJECTORS, AND THE LIKE.

1,302,895.  Specification of Letters Patent.  Patented May 6, 1919.

Application filed April 1, 1912, Serial No. 687,745. Renewed October 3, 1918. Serial No. 256,763.

*To all whom it may concern:*

Be it known that we, CARL BUCHWALD, PAUL QUEISSER, and HERMANN VIERTEL, citizens of the Empire of Germany, and respectively residing at Berlin, Friedenau, near Berlin, and Lichtenberg, near Berlin, Germany, have invented certain new and useful Improvements in Negative Electrodes for Search-Lights, Projectors, and the like, of which the following is a specification.

Our invention relates to negative electrodes for search-lights, projectors and the like.

When making very powerful lights, such as those for lighthouses, but particularly for marine search-lights, a difficulty is met with, for whose removal various proposals have been made. When two carbon electrodes are burnt by means of the electric current and currents of considerable strength are employed, e. g., 60 to 100 amperes, and particularly in large search-lights up to 200 amperes, the greater the strength of current is, the more difficult it is to maintain the light perfectly steady.

Various proposals for keeping the light steady were based on the fact that the current readily and steadily issues from a pointed negative electrode, whereas the steadiness is done away with as soon as the original shape of the tip of the negative electrode is changed while burning.

After burning a relatively short time, say a quarter to half an hour, the tip of the negative carbon becomes curved in the form of the head of an explosive shell or projectile. The more the tip acquires a round form the more difficult it is to maintain a constantly steady arc.

As is well-known, the positive electrode acquires a very highly crater-like shape, and as the current always selects the best path, *i. e.*, the shortest path under like conditions, the distance from the edge of the crater of the positive carbon to the curved end of the negative carbon is shorter than the axial distance between the two carbons.

The current goes from the negative carbon to the edge of the positive crater, simultaneously leaves the point of the negative carbon and then flows along the unavoidable residues of the two carbons; the arc begins to hiss and as the negative carbon has lost its point it is impossible to make the light steady again without mechanically repointing the negative carbon.

Now various proposals have been made for maintaining the negative carbon with a burning point. Negative carbons have been made comprising a core of carbon more refractory than the shell. Such carbons having more refractory shells were not satisfactory, as they had other defects and did not attain the end in view.

It has also been attempted to employ relatively thin carbons, and it has been proposed to stop the smoldering of the same due to their ohmic resistance by surrounding them with a fireproof protective casing. This method of surrounding carbons with a fireproof protective casing led, it is true, to perfectly steady burning, but there is still the difficulty of accommodating a sufficiently long thin carbon in the chamber of the search-light, because it must be longer than the available distance between the focus and the reflector.

It has been known to copperplate carbons in order to make them as thin as possible; this also attained its purpose to a certain extent; but has the great defect that the copper melts and drops of copper splash on the reflector, whereby the expensive reflectors become unusable in a short time.

Again, it has been very generally attempted to employ as thin a carbon as possible and to increase its conductivity by inserting in it a copperplated core. The copperplating of the core results in improved conductivity, less ohmic resistance and, consequently, less heating of the negative carbon. This arrangement, however, did not certainly lead to the desired end, and the makers of search-lights and search-light carbons had to continue to endeavor to find a mode of guaranteeing absolute steadiness of the light in a search-light.

For marine purposes it is absolutely necessary to illuminate the object which is to be illuminated without flickering of the light, i. e., without the light of the search-light fluctuating and quivering. Otherwise even the most powerful light is not crowned with the desired success.

Now a primary object of our invention is to provide improved negative electrodes by which the end in view is more nearly attained than has been the case heretofore. Essentially our invention consists in embedding within a large outer body carbon of usual well known construction, cores which are separately well known in the art as "hard" and "soft" cores but which cores have never before so far as we are aware been used together within the larger outer body of refractory carbon which is relatively a poor conductor as compared to the "hard" core and very much more refractory than the "soft" core. In this combination of elements the current will flow principally through the "hard" good conducting core while the "soft" core by reason of its capacity for increasing the conductivity of the arc will prevent such arc jumping from the "hard" core to the hard outer shell of the main body carbon.

The apparatuses in question must in by far the majority of cases be provided with horizontal carbon electrodes. Owing to the air being heated it rises, of course, with considerable buoyancy. Now as soon as the negative carbon has lost its slender and sharp point, as mentioned above, the buoyancy of the hot air causes the seat of the arc at the negative carbon to be shifted from the tip upward. As soon as this has taken place to any considerable extent owing to the rising current of air, the danger of the arc settling at the outer shell of the two carbons increases, and at the same moment the arc becomes unsteady and flickers and hisses disagreeably.

Therefore, we provide near the core in question, and preferably over the central core which is intended to fix the arc, a mass which supplies to the arc a sufficient quantity of those substances which increase its conductivity. We do this by arranging over the central core which may be copperplated or provided with any other electrically conducting coating a channel which we fill with substances which solely increase the conductivity of the arc.

Several illustrative embodiments of our invention are represented by way of example in the accompanying drawing, wherein:—

Figures 1 to 6 are diagrammatic cross-sections showing various forms of our improved carbons each provided with a hard core and an auxiliary, arc-feeding core according to our invention. Fig. 7 represents a longitudinal section of Fig. 1.

Referring to the drawing, we may either employ an arc-feeding core $b$ over the central core $a$ as shown in Fig. 1, or we may use a flattened central core $a_1$ and fill the resulting chamber with a flattened core $b_1$ composed of the arc-feeding mass, as shown in Fig. 2, whereby one composite core $a_1$, $b_1$ of circular section is obtained.

In the form shown in Fig. 3 we provide in the upper part of the central core $a$ a core $b$ of circular section composed of the arc-feeding mass.

As Fig. 4 shows, instead of using a round central core we may use a flattened oval central core $a_2$, its upper part being substituted with a core $b_2$ composed of the arc-feeding mass, whereby a composite core $a_2$, $b_2$ of oval section is obtained.

Furthermore, we may arrange in the negative electrode a carbon tube $a_3$ which is copperplated or has been made a good electrical conductor in another manner, and fill this tube with a core $b$ composed of the substances in question which make the arc a good electrical conductor, as shown in Fig. 5.

In search-lights in which the axis of the electrode is horizontal, as shown in Fig. 6, we prefer, however, for the axis of the carbon tube $a_3$ to be located above the axis of the electrode in order thus to take account of the existing circumstances.

In all forms embodying our invention we use a combination of a solid, good electrically conducting core which is as highly refractory as possible, with a core which sufficiently fixes the arc.

Thus the essence of the invention is the arrangement, in negative electrodes for search-lights, of a combination core which comprises, on the one hand, a hard core which is a good electrical conductor in itself or is made a good electrical conductor by electroplating, for maintaining as good conductivity of the entire carbon as possible, and, on the other hand, a core which feeds the arc and tends to prevent the arc moving away from the point.

We claim:—

1. A negative electrode for searchlights, containing a separately fired hard core constituting a good current conductor and consisting of tar and carbon, and a soft core consisting essentially of carbon and water glass and whose ingredients increase the conductivity of the arc.

2. A negative electrode for searchlights containing a hard core which is a good conductor for the current, and a soft core consisting of material which increases the conductivity of the arc, said soft core being concentrically arranged within said hard core.

3. A negative electrode for searchlights, comprising an outer electrode body, a hard good conducting core of relatively large cross-sectional area, and a soft core of relatively small cross-sectional area composed of material which increases the conductivity of the arc.

In testimony whereof we have signed our names to this specification in the presence of two witnesses.

CARL BUCHWALD.
PAUL QUEISSER.
HERMAN VIERTEL.

Witnesses:
HENRY HASPER,
WOLDEMAR HAUPT.